US010795665B2

(12) United States Patent
Imi et al.

(10) Patent No.: US 10,795,665 B2
(45) Date of Patent: Oct. 6, 2020

(54) RELAY DEVICE AND HOT WATER SUPPLY DEVICE

(71) Applicant: NORITZ CORPORATION, Hyogo (JP)

(72) Inventors: Yasunori Imi, Kakogawa (JP); Takahito Hashimoto, Kobe (JP); Naoki Tawada, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 141 days.

(21) Appl. No.: 16/247,601

(22) Filed: Jan. 15, 2019

(65) Prior Publication Data

US 2019/0227790 A1    Jul. 25, 2019

(30) Foreign Application Priority Data

Jan. 22, 2018    (JP) .................................. 2018-008200

(51) Int. Cl.
*G06F 9/44*    (2018.01)
*G06F 8/658*    (2018.01)
*H04L 29/08*    (2006.01)
*G06F 8/71*    (2018.01)
*F24H 9/20*    (2006.01)

(52) U.S. Cl.
CPC ........... *G06F 8/658* (2018.02); *F24H 9/2007* (2013.01); *G06F 8/71* (2013.01); *H04L 67/34* (2013.01)

(58) Field of Classification Search
CPC ....................................................... G06F 9/44
See application file for complete search history.

(56) References Cited

U.S. PATENT DOCUMENTS

| 2017/0010015 | A1* | 1/2017 | Jan | ............................ F24F 3/14 |
| 2018/0048987 | A1* | 2/2018 | Morris | ................. H04B 5/0075 |
| 2018/0060063 | A1* | 3/2018 | Sato | ........................ H04L 67/34 |

FOREIGN PATENT DOCUMENTS

JP    2017058026    3/2017

* cited by examiner

*Primary Examiner* — Jae U Jeon
(74) *Attorney, Agent, or Firm* — JCIPRNET

(57) ABSTRACT

A relay device and a hot water supply device are provided. A communication adapter downloads an update program for software update of the constituent devices of a hot water supply system from a management center via a communication network (the Internet). The downloaded update program is stored in a storage part in the communication adapter. When there is more than one software update target device, the communication adapter sequentially selects one of the target devices and sequentially transmits the update program stored in the storage part to the devices one by one via a communication line.

16 Claims, 7 Drawing Sheets

RELAY DEVICE AND HOT WATER SUPPLY DEVICE

CROSS REFERENCE TO RELATED APPLICATION

The disclosure claims priority under 35 U.S.C. § 119 to Japanese Application No. 2018-008200 filed on Jan. 22, 2018. The entire content of which is incorporated herein by reference.

BACKGROUND

Technical Field

The disclosure relates to a relay device and a hot water supply device and more particularly relates to software update for constituent devices of a hot water utilization facility (such as water heater, multi-hot water supply system, bath water reheating device, filtration device, or hot water heating equipment) using the relay device in a remote management system that communicably connects the hot water utilization facility and a management device via the relay device.

Description of Related Art

A remote management system for a multi-hot water supply system, which is an example of the hot water utilization facility, is described in Japanese Laid-Open No. 2017-58026 (Patent Document 1). In the remote management system of Patent Document 1, various information of the hot water supply system is transmitted to a management center (server) with a communication adapter communicably connected to the hot water supply system as the relay device.

For example, the communication adapter is communicably connected to the hot water supply system via a 2-core communication line and is connected to a router, which is connected to a communication network such as the Internet, by wireless communication. By connecting the communication adapter communicably with the management center (server) via the router and the communication network, it is possible to perform bidirectional information transmission via the communication network between the hot water supply system and the management center.

RELATED ART

Patent Document

[Patent Document 1] Japanese Laid-Open No. 2017-58026

SUMMARY

The constituent devices of the hot water supply system operate by executing a pre-stored software program. Therefore, it is possible to upgrade the function by updating the software of each device. In the remote management system described in Patent Document 1, when software update is performed, the update program for software update can be downloaded from the management server by the communication adapter without manual operation of the operator.

However, when there are multiple devices to be updated, for example, a large number of hot water utilization facilities are communicably connected to the communication adapter, there is concern that the communication traffic between the communication adapter and the management server may increase due to download of the update program and the communication time may also increase.

One of the embodiments of the disclosure suppress the communication traffic with the management server in the software update for multiple devices, in the relay device applied to the remote management system of the hot water utilization facilities that use the communication with the management server.

In one of the embodiments of the disclosure, a relay device communicably connected between a hot water supply system and a management device of the hot water supply system includes a first communication part, a second communication part, a storage part, and a control part. The first communication part is configured to transmit/receive information to/from the hot water supply system via a communication line. The second communication part is configured to transmit/receive information to/from the management device via a communication network. The storage part includes a program storage area. The control part controls operations of the first communication part and the second communication part and writing and reading to/from the program storage area. The first communication part receives, from each of a plurality of devices which are components of the hot water supply system, identification information and version information of software of the devices. The second communication part receives an update program for software update of the devices from the management device. The control part writes the update program received by the second communication part to the program storage area and extracts one or more software update target devices from the devices based on the identification information and the version information of the devices. When there are more than one software update target device, the control part sequentially selects one of the software update target devices and transmits the update program stored in the program storage area to the selected one device by the first communication part.

According to the above relay device, it is possible to sequentially transmit the update program, which has been received from the management device and stored in the storage part, to a plurality of software update target devices one by one. Therefore, the number of times of update program communication between the management device and the relay device can be made smaller than the number of the software update target devices, so as to suppress the communication traffic with the management server in the software update for a plurality of devices.

In one of the embodiments of the disclosure, a hot water supply device is a component of the hot water supply system and includes a controller. The controller is communicably connected to the relay device via the communication line. The controller executes data communication with the management device via the relay device. The software update of the controller is executed using the update program transmitted from the relay device.

In one of the embodiments of the disclosure, the control part transmits an inquiry about whether the software update is executable to the selected one device of the software update target devices by the first communication part, and transmits the update program when the one device replies that the software update is executable.

With this configuration, it is possible to avoid starting the software update by replying "inexecutable" with respect to whether it is executable in the device that is in operation.

In one of the embodiments of the disclosure, the control part switches to select another device of the software update target devices when the selected one device of the software update target devices replies that the software update is inexecutable in response to the inquiry.

With this configuration, it is possible to sequentially advance the software update by delaying the device that is in operation among the software update target devices.

In one of the embodiments of the disclosure, when the selected one device of the software update target devices replies that the software update is inexecutable in response to the inquiry, the control part selects the one device again and transmits the inquiry after a predetermined first time elapses.

With this configuration, when the selected one device of the software update target devices replies that the software update is inexecutable in response to the inquiry, it is possible to automatically restart the software update of the device after the predetermined time elapses.

Or in one of the embodiments of the disclosure, when receiving a notification of abnormal termination of the software update from the one device, to which the update program has been transmitted, of the software update target devices, the control part transmits again the inquiry about whether the software update is executable to the one device by the first communication part after a predetermined second time elapses, and transmits again the update program when the one device replies that the software update is executable in response to the inquiry.

In this manner, it is possible to automatically restart the software update for the device, in which the software update of the update program has once been terminated abnormally, after the predetermined time elapses.

Or in one of the embodiments of the disclosure, when receiving a notification of normal termination of the software update from all the software update target devices, the control part changes a storage content corresponding to the update program in the program storage area from a rewrite prohibited state to a writable state.

With this configuration, it is possible to avoid downloading the update program again from the management device until the software update is terminated normally in all the software update target devices.

Effects

According to the disclosure, it is possible to suppress the communication traffic with the management server in the software update for a plurality of devices, in the relay device applied to the remote management system of the hot water utilization facilities that use the communication with the management server.

DESCRIPTION OF THE EMBODIMENTS

Figure 1:
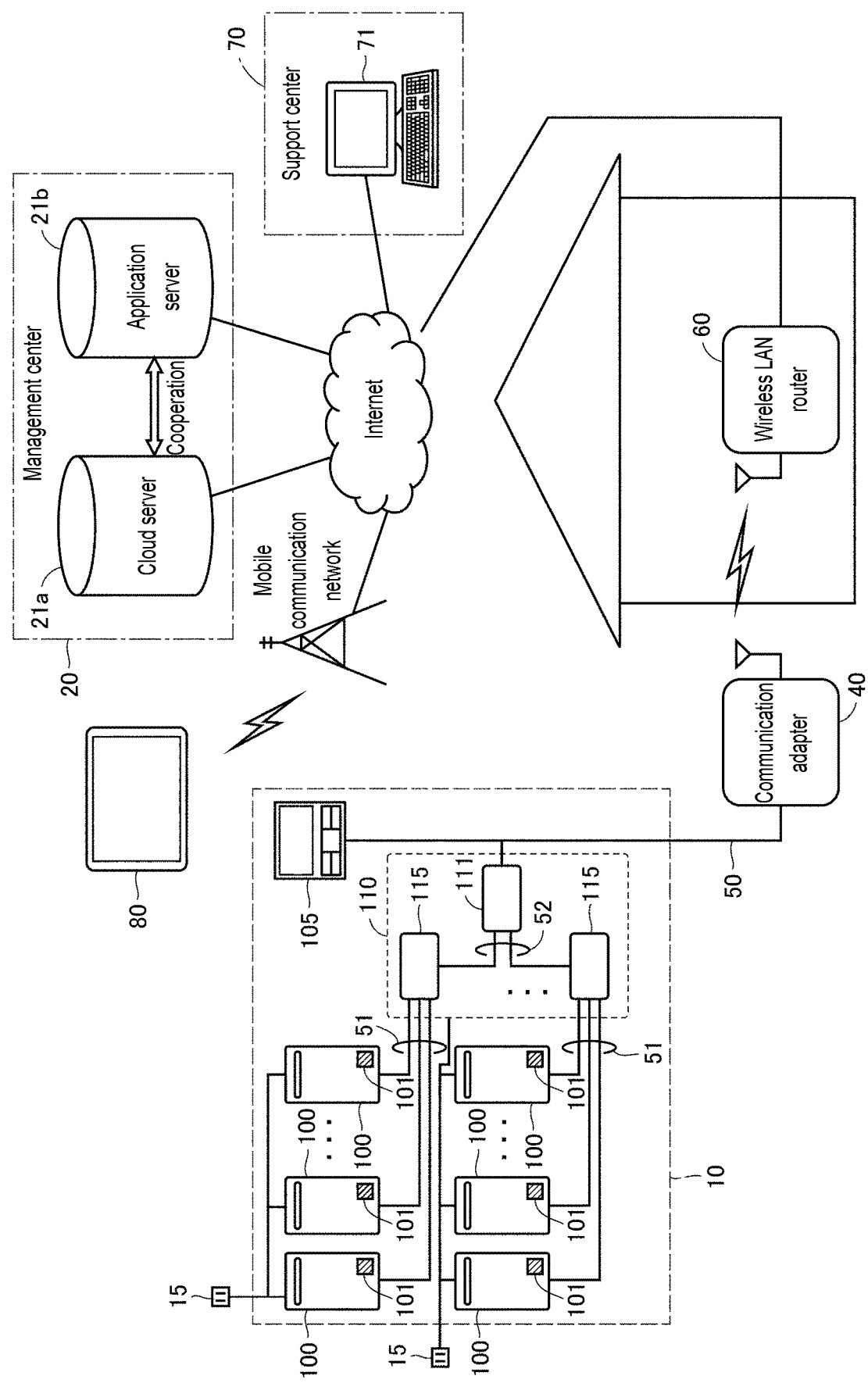
FIG. 1 is a block diagram showing a configuration example of the remote management system of hot water utilization facilities using the communication adapter according to the present embodiment.

Hereinafter, an embodiment of the disclosure will be described in detail with reference to the drawings. In the following description, the same or corresponding parts in the drawings are denoted by the same reference numerals, and in principle, the description thereof will not be repeated.

FIG. 1 is a block diagram showing a configuration example of a remote management system of hot water utilization facilities using a communication adapter according to the present embodiment.

Referring to FIG. 1, the hot water supply system 10 includes hot water supply devices 100 (an example of the "hot water utilization facility") and a remote controller 105 for inputting an operation command.

The hot water supply device 100 is, for example, a water heater, and one or more hot water supply device 100 is disposed. Each hot water supply device 100 includes a controller 101, which is typically constituted by a microcomputer. A program for controlling the operation of the hot water supply device 100 is stored in the controller 101. For controlling a plurality of hot water supply devices 100, one may dispose a system controller 115. A maximum of m hot water supply devices 100 (m: a predetermined natural number) can be connected to one system controller 115 via a communication line 51. In addition, the hot water supply device 100 may be constituted by a water replenishing device for a bathtub, etc.

In the configuration example of FIG. 1, a parent system controller 111 is disposed for integrating a plurality of system controllers 115 disposed, and the parent system controller 111 and each system controller 115 are connected by a communication line 52. Further, the parent system controller 111 is connected to the remote controller 105 and the communication adapter 40 via a communication line 50. In the following description, the aggregate of the parent system controller 111 and the system controller 115 is also collectively referred to as a system controller 110. Nevertheless, the system controller 110 may have any configuration and is not limited to the hierarchical structure of the parent system controller 111 and the system controllers 115. The system controller 110 may be constituted by one or more system controllers 115.

Software processing for operating the hot water supply device 100 according to the command from the system controller 110 is realized by executing the program stored in each controller 101.

The communication adapter 40 can be installed outdoors, for example, around the outer wall of a house or in a garage, together with the hot water supply device 100. The communication adapter 40 has a wireless communication function for communicating with a wireless LAN (Local Area Network) router 60 disposed indoors by a predetermined communication protocol (for example, IEEE 802.11n, etc.). Details of the communication adapter 40 will be described later.

The wireless LAN router 60 is connected to an Internet network (communication network). The wireless LAN router 60 can function as a master unit of wireless LAN, so as to connect a plurality of wireless LAN slave units in a wireless manner. The communication adapter 40 can operate as a wireless LAN slave unit and can connect to the Internet via the wireless LAN router 60 when the communication connection (wireless link) with the wireless LAN router 60 is established.

Through connection of the communication lines 50 to 52, each hot water supply device 100 can transmit/receive data bidirectionally with each of the remote controller 105 and the communication adapter 40 via the system controller 110. Data can also be transmitted/received bidirectionally between the remote controller 105 and the communication adapter 40.

The remote controller 105 is connected to a plurality of hot water supply devices 100 via the system controller 110, by which it is possible to control the operations of a plurality of hot water supply devices 100 connected to the system controller 110 by the common remote controller 105.

For example, 2-core communication lines can be used as the communication lines 50 to 52. In the following description, the communication lines 50 to 52 are also referred to as 2-core communication lines 50 to 52. The system controller 110 is configured to convert the power supplied from an external power supply 15 such as a commercial power system to a power supply voltage for external device and output it to the 2-core communication line 50, so as to supply the operating power supply of the remote controller 105 and the communication adapter 40 from the system controller 110. In this case, communication data can be superimposed on the power supply voltage in the 2-core communication lines 50 to 52.

Furthermore, in the remote management system of the hot water utilization facility according to the present embodiment, a management center 20 and a support center 70 are connected to the communication network (typically, the Internet). The management center 20 includes a cloud server 21a and an application server 21b. The cloud server 21a and the application server 21b are communicably connected to each other via the Internet network or a dedicated line, and can cooperate with each other to provide various services.

Figure 2:
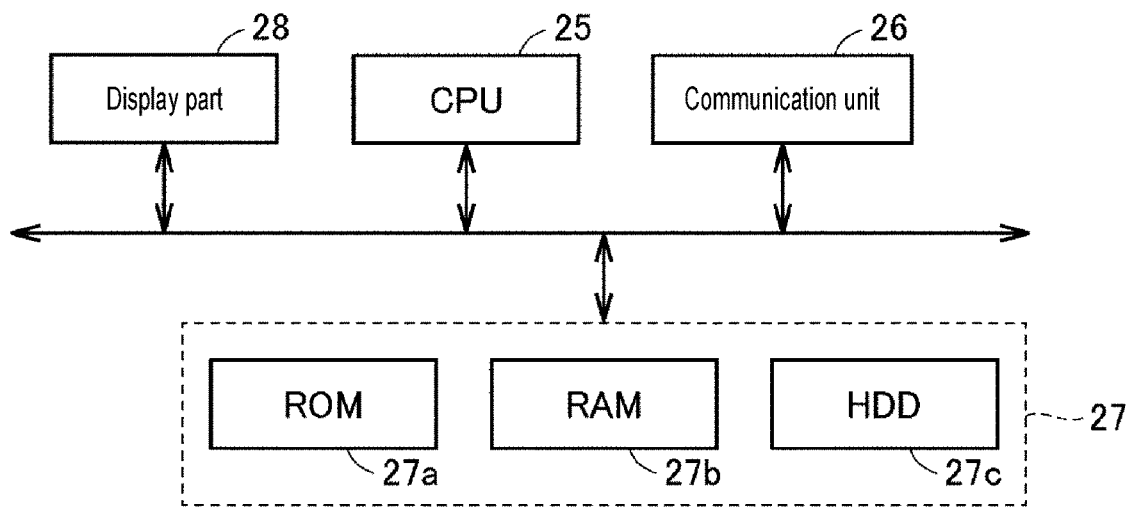
FIG. 2 is a schematic configuration diagram of the server device that constitutes the cloud server and the application server shown in FIG. 1.

FIG. 2 is a schematic configuration diagram of a server device 21 that constitutes the cloud server 21a and the application server 21b.

Referring to FIG. 2, the server device 21 includes a CPU (Central Processing Unit) 25 for controlling the entire device, a communication unit 26 and a memory 27 connected to the CPU 25, and a display part 28. The communication unit 26 has a function of communicating with another device or server by communication connected to the communication network (the Internet). The display part 28 is constituted by a display screen.

The memory 27 includes, for example, a ROM (Read Only Memory) 27a which is a memory for storing the program to be executed by the CPU 25, a RAM (Random Access Memory) 27b which is a memory for serving as a work area when the CPU 25 executes the program or for storing the calculated value, and an HDD (Hard Disk Drive) 27c which is an example of a large storage device.

The server device 21 can be configured to have a function corresponding to a general computer. The server device 21 may further include an operation part for receiving an operation input.

Referring to FIG. 1 again, the cloud server 21a is always connected with a large number of communication adapters 40 that are mainly installed at homes, lodging facilities, etc., and by communicating with these communication adapters 40, the cloud server 21a collects and manages various information of the hot water supply system 10 of each customer such as homes and each lodging facility. For example, the information to be collected can include the hot water supply amount and fuel consumption amount per unit time, hot water supply temperature, error information generated in each hot water supply system 10, etc.

The application server 21b manages a large number of user accounts for a large number of users such as homes and lodging facilities and receives a login from an operation terminal such as a smartphone (not shown) possessed by the user to provide various services to the operation terminal possessed by the user.

Dedicated application software for using the services provided by the application server 21b is installed on the smartphone so that the login operation and various operations after login can be performed from the application software. Alternatively, by providing Web-based services, login and other operations can be performed using an appropriate Web browser.

Nevertheless, the application server 21b may provide only an application service for the user terminal such as a smartphone and the customer information including the user account may be managed by another customer information management center. Alternatively, the cloud server 21a and the application server 21b may be constituted by an integrated server device.

The services provided by the cloud server 21a and the application server 21b can be designed appropriately as required. For example, a connected device confirmation service, an operation information collection management service, an error monitoring service, a maintenance monitor service, a remote operation service, etc. can be provided.

With the connected device confirmation service, it is possible to confirm the model and system configuration of the hot water supply device 100 of the hot water supply system 10 connected to the communication adapter 40 (to be described later). In addition, it is possible to determine the model and system configuration on the server side based on the information that the communication adapter 40 collects from the hot water supply system 10.

With the operation information collection management service, it is possible to periodically collect the operation information of the hot water supply system 10 from the communication adapter 40 and manage it at every unit time (for example, every hour). Although the operation information to be collected may be any information, it is possible to collect the cumulative hot water supply amount or cumulative fuel consumption amount per unit time, for example. The collected operation information can also be used for developing development data by big data analysis.

With the error monitoring service, when an error occurs in the hot water supply system 10, it is possible to acquire information related to the error from the communication adapter 40 and send an error notification to a terminal 71 of the support center 70 or the user's mail address.

With the maintenance monitor service, it is possible to monitor the operating condition of the hot water supply system 10 in real time, for example, when repairing the hot water supply system 10. Specifically, it is possible to monitor in real time the operating condition of the hot water supply system 10 connected to the designated communication adapter 40 by a tablet terminal 80, etc. for site worker, which is communicably connected to the cloud server 21a.

Alternatively, in the remote management system of the hot water utilization facility according to the present embodiment, it is also possible to further provide a remote operation service of the hot water supply system 10. For example, it is possible to perform a predetermined operation of the hot water supply system 10, such as an operation of switching ON/OFF the hot water supply operation switch and an operation of changing the hot water supply setting temperature, via the communication network (the Internet) from the terminal 71 of the support center 70, the tablet terminal 80 for site worker, and the smartphone (not shown) possessed by the user. At this time, the remote operation performed by the user can be made executable by logging in to the application server 21b from the smartphone (not shown), etc. Moreover, as part of the services of the remote management system, it is also possible to display the operation information collected from the communication adapter 40 in the logged-in state to be viewed on the smartphone (not shown), etc.

The various services described above are enabled by data communication between the management center 20 (hereinafter simply referred to as the server 20) and the hot water supply system 10 via the communication adapter 40.

Figure 3:
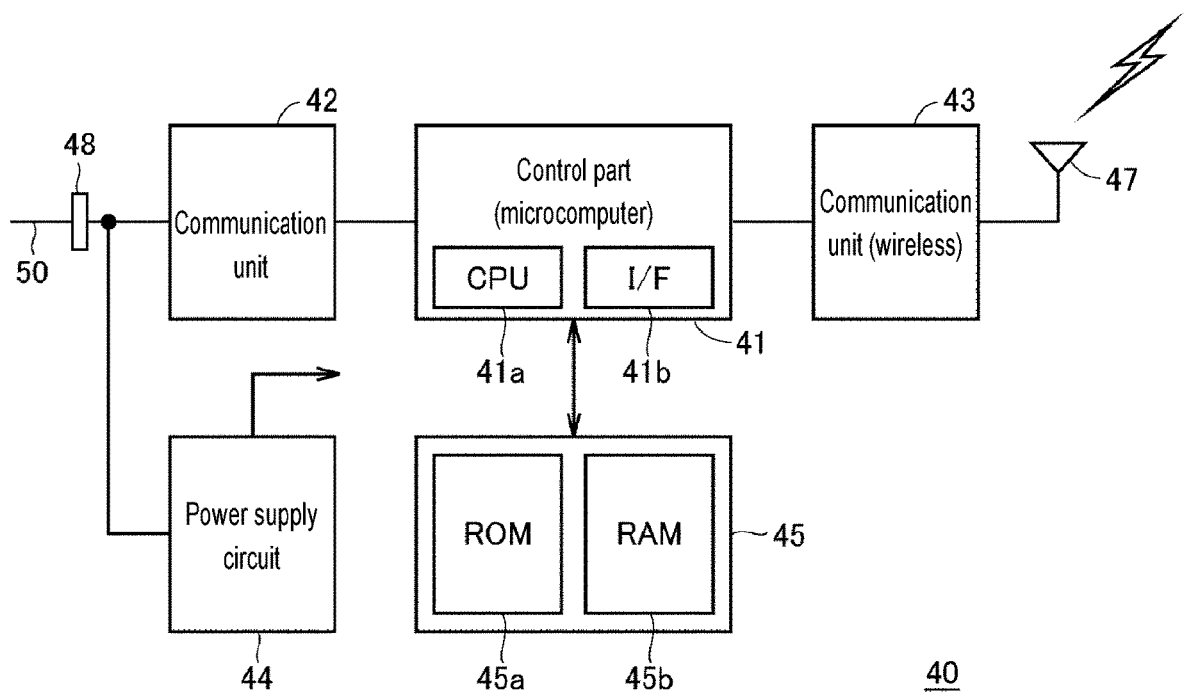
FIG. 3 is a block diagram showing a configuration example of the communication adapter shown in FIG. 1.

FIG. 3 is a block diagram showing a configuration example of the communication adapter 40. Referring to FIG. 3, the communication adapter 40 includes a control part 41, communication units 42 and 43, a power supply circuit 44, a memory 45, an antenna 47, and a connector 48. The communication line 50 (2-core communication line) shown in FIG. 1 is connected to the connector 48.

The control part 41 may be constituted by a microcomputer that includes a CPU 41a and an interface (I/F) 41b. The communication unit 42 is configured to transmit/receive information by transmitting/receiving data bidirectionally between the system controller 110 and the remote controller 105 via the 2-core communication line 50 connected to the connector 48. The communication unit 43 is configured to transmit/receive information by transmitting/receiving data bidirectionally with the wireless LAN router 60 or the smartphone (not shown) by wireless communication via the antenna 47. The power supply circuit 44 receives power supply from the 2-core communication line 50 connected to the connector 48 and generates the operating power supply voltage of each element in the communication adapter 40.

The memory 45 has a ROM 45a and a RAM 45b. For example, a program for controlling the operation of the communication adapter 40 is stored in the ROM 45a, and the control part 41 reads the program stored in the ROM 45a and develops it in the RAM 45b at the time of booting processing. That is, the ROM 45a corresponds to an embodiment of the "program storage area". The control part 41 executes the program developed in the RAM 45b and controls the operation of the communication adapter 40.

In FIG. 3, the memory 45 and the control part 41 are shown as separate elements, but part or all of the memory 45 can be incorporated in the control part 41.

The communication adapter 40 can communicate with the communication unit 26 of the server 20 via the communication network (the Internet) by using the communication unit 43. Thus, the communication adapter 40 can periodically transmit to the management center 20 the operation information of the hot water supply system 10 for the above-described operation information collection management service. On the other hand, the management center 20 can also transmit data and information to the communication adapter 40. In this manner, it is possible to execute data communication for constituting the remote management system between the hot water supply device 100 and the server 20 using the communication adapter 40 that is provided as the relay device.

In the remote management system according to the present embodiment, when upgrading the program (so-called firmware) of each device that constitutes the communication adapter 40 and the hot water supply system 10, it is possible to deliver a new program for software update (hereinafter also referred to as "update program") from the server 20 to the communication adapter 40. That is, in the communication adapter 40 according to the present embodiment, software update can be executed by storing the update program downloaded from the server 20 in the ROM 45a.

Likewise, the software update of the constituent device of the hot water supply system 10 can also be executed by the update program downloaded from the server 20. In this case, the update program from the server 20 is also relayed by the communication adapter 40 and transmitted to the target device of the software update.

If a plurality of devices that are the components of the hot water supply system 10, typically a plurality of hot water supply devices 100, are the targets for software update, it is necessary to write the same update program to the controller 101 of each hot water supply device 100. In the following description, such software update for a plurality of devices will be described.

In the configuration example of FIG. 3, the communication unit 42 corresponds to an embodiment of the "first communication part", the communication unit 43 corresponds to an embodiment of the "second communication part", the ROM 45a corresponds to an embodiment of the "storage part", and the control part 41 constituted by a microcomputer corresponds to an embodiment of the "control part". Further, the management center (server) 20 corresponds to an embodiment of the "management device".

Figure 4:
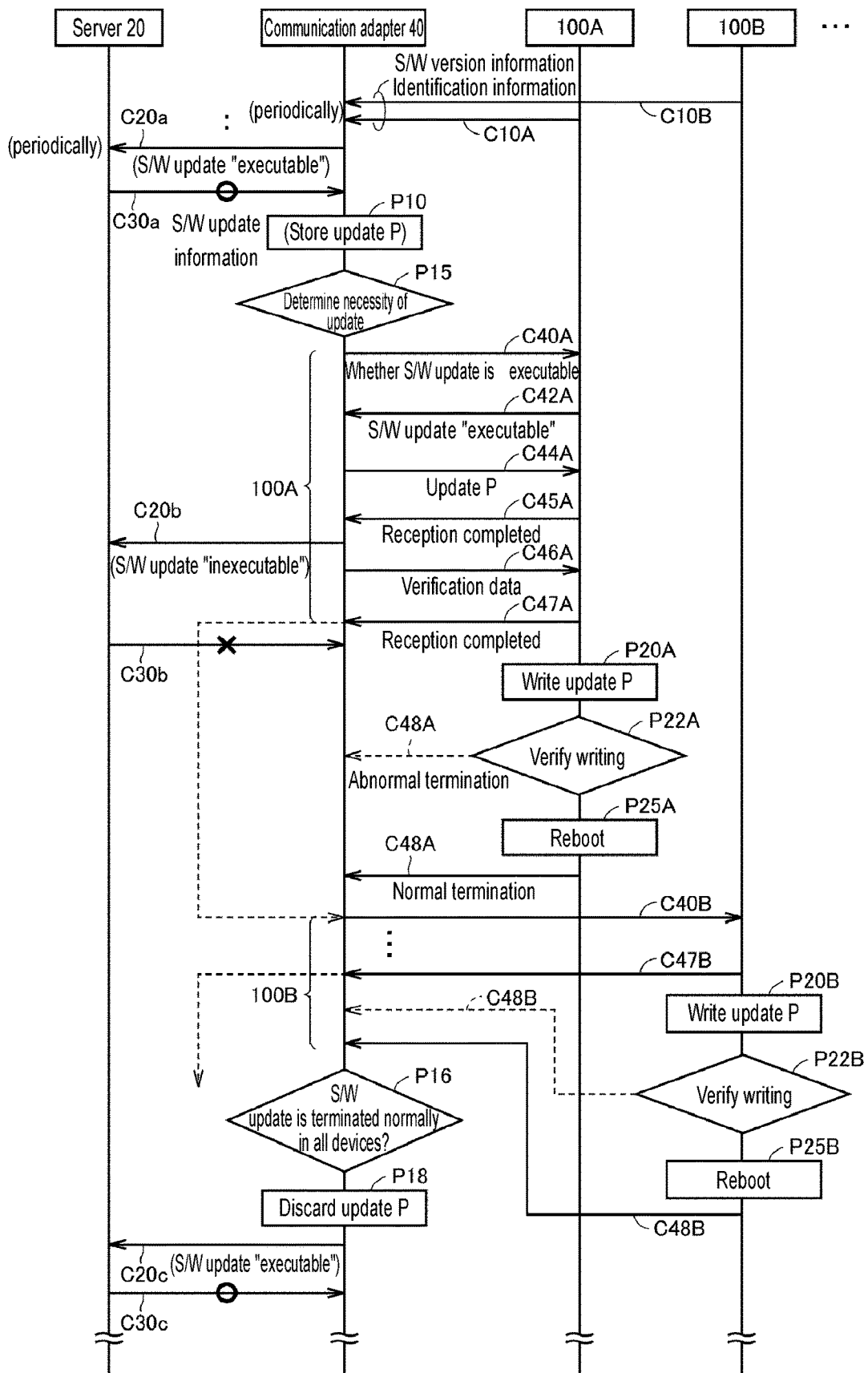
FIG. 4 is a sequence diagram illustrating a flow of software update processing for a plurality of devices for the hot water supply system in the remote management system according to the present embodiment.

FIG. 4 is a sequence diagram illustrating a flow of the software update processing for a plurality of devices for the hot water supply system in the remote management system according to the present embodiment. FIG. 4 illustrates the software update processing for a plurality of hot water supply devices 100A, 100B . . . .

Each of the hot water supply devices 100 transmits to the communication adapter 40 information for identifying the software being executed (for example, information indicating the version of the program being executed) and identification information for distinguishing the hot water supply devices. In the following description, the information for identifying the software is also referred to as "S/W version information". The S/W version information and the identification information can be transmitted, for example, using periodic communications C10A, C10B . . . from each hot water supply device 100 to the communication adapter 40. Thus, the communication adapter 40 has the S/W version information of each of the hot water supply devices 100A, 100B . . . that constitute the hot water supply system 10.

Periodic communications such as heartbeat communication are executed also between the communication adapter 40 and the server 20. The communications include the communication C20 from the communication adapter 40 to the server 20 and the communication C30 from the server to the communication adapter 40. The communication C30 is executed as a response to the communication C20. In the following description, subscripts a, b or the like are attached when referring to the communication at a specific timing among the periodic communications C20 and C30.

Information indicating whether the software update (hereinafter also referred to as "S/W update") is executable in the hot water supply system 10, to which the communication adapter 40 is connected, is added to each communication C20. For example, the S/W update is "inexecutable" when the S/W update is being executed in the hot water supply system 10.

The S/W update being "executable" is transmitted to the server 20 in the communication C20a. When there is a new program to be updated, the server 20 transmits S/W update information by the communication C30a in response to the communication C20a, which notifies that the S/W update is "executable". The S/W update information includes information indicating the download destination URL (Uniform Resource Locator) of the new program (hereinafter also referred to as "update program") and the start date and time of the S/W update. Accordingly, the communication adapter 40 can download the update program from the server 20 by accessing the URL at the start date and time. Alternatively, at this stage, the update program itself may be transmitted from the server 20 to the communication adapter 40.

The following illustrates the processing that is performed when the update program for software update of the hot water supply devices 100A, 100B . . . (hereinafter referred to as "S/W update targets") is downloaded in the communication C30a.

When receiving the update program (denoted as "update P" in FIG. 4) using the communication unit 43 (FIG. 2), the communication adapter 40 stores the update program in the ROM 45a (FIG. 3) by the process P10. In the ROM 45a, the storage area of the update program for the hot water supply device 100 is provided separately from the area that stores the program being executed of the communication adapter 40 itself. Alternatively, considering that the communication adapter 40 is generally used in the power-on state for a long period of time, the update program for the hot water supply device 100 may be stored in the RAM 45b. That is, the RAM 45b may also be an embodiment of the "program storage area".

Further, the communication adapter 40 extracts the hot water supply devices 100A, 100B . . . as the S/W update targets based on the S/W version information of a plurality of hot water supply devices. If S/W update is not required, for example, if the version of the program being executed by each hot water supply device 100 and the version of the update program from the server 20 are the same according to the S/W version information of each hot water supply device 100, it is determined in the process P15 that S/W update is not required.

In the example of FIG. 4, it is determined by the process P15 that S/W update of the hot water supply devices 100A, 100B . . . is necessary. Thus, the communication adapter 40 sequentially selects one of the hot water supply devices 100A, 100B . . . which are the S/W update targets, and executes the process of transmitting the update program. In the example of FIG. 4, the hot water supply device 100A is selected first, and an inquiry about whether the S/W update is executable is transmitted from the communication adapter 40 to the hot water supply device 100A by the communication C40A.

The hot water supply device 100A replies with whether the S/W update is executable by the communication C42A in response to the communication C40A. For example, when the hot water supply device 100 is in operation, the S/W update is set "inexecutable". When receiving that the S/W update is "executable" by the communication C42A, the communication adapter 40 transmits the update program of the hot water supply device 100 temporarily stored in the ROM 45a to the hot water supply device 100A by the communication C44A. According to this, the hot water supply device 100A returns a message that reception of the update program is completed by the communication C45A.

When being notified by the hot water supply device 100A that reception of the update program is completed by the communication C45A, the communication adapter 40 transmits verification data paired with the update program by the communication C46A. The verification data can be created, for example, by CRC (Cyclic Redundancy Check) which is a type of error detection code.

When receiving the verification data, the hot water supply device 100A replies to the communication adapter 40 that reception of the verification data is completed by the communication C47A. By a series of communications C40A to C47A using the communication unit 42, the process of transmitting the update program for the S/W update from the communication adapter 40 to the selected one hot water supply device 100A is completed. According to this, in the hot water supply device 100A, the S/W update processing of rewriting to the update program is started.

In the hot water supply device 100A, the received update program is written to the memory (program storage area) in the controller 101 (FIG. 1) by the process P20A. Then, in the process P22A, whether the update program is written normally is confirmed using the verification data. If the update program is written normally, the controller 101 is rebooted by reset by the process P25A. Thus, the controller 101 is in a state of controlling the operation of the hot water supply device 100A by executing the update program. According to this, the hot water supply device 100A notifies the communication adapter 40 that the S/W update is terminated normally by the communication C48A.

If it is determined in the process P22A that the update program is written abnormally, the hot water supply device 100A notifies the communication adapter 40 that the S/W update is terminated abnormally by the communication C48A indicated by the dotted line in FIG. 4. In this case, since the controller 101 is not reset, the state of controlling the operation of the hot water supply device 100A by the program before update is maintained.

On the other hand, since the S/W update processing is started in the hot water supply system 10, the communication adapter 40 changes the status of whether the S/W update is executable in the periodic communication C20 to "inexecutable". Thus, in the communication C20b and thereafter, the server 20 is notified that the S/W update in the hot water supply system 10 connected to the communication adapter 40 is inexecutable. Therefore, in the communication C30b in response to the communication C20b, unlike the communication C30a, it is not possible to add the S/W update information for transmission.

Further, when detecting that the process of transmitting the update program to the hot water supply device 100A is completed (C47A), the communication adapter 40 selects the next hot water supply device 100B. Then, the update program and the verification data are transmitted to the hot water supply device 100B by the same communications C40B to C47B as the communications C40A to C47A.

In the hot water supply device 100B, the S/W update performed by writing the received update program and rebooting is executed by the same processes P20B to P25B as the processes P20A to P25A. Then, information as to whether the S/W update in the hot water supply device 100B is terminated normally or abnormally is returned to the communication adapter 40 by the communication C48B.

When detecting that the process of transmitting the update program for the S/W update of the selected one hot water supply device 100B is completed by the communication C47B, the communication adapter 40 selects another one (other than 100A and 100B) of the hot water supply devices 100A, 100B . . . that have been extracted as the S/W update targets, and starts a series of processes equivalent to the communications C40A to C47A. Thus, the communication adapter 40 can sequentially transmit the update program stored in the ROM 45a to each of the hot water supply devices extracted as the S/W update targets.

Whether the S/W update of the update program is terminated normally or abnormally is returned from each of the hot water supply devices 100A, 100B . . . which received the update program by the communications C48A, C48B . . . . In the communication adapter 40, whether the notification of "normal termination" is received from all the hot water supply devices 100A, 100B . . . , which are set as the S/W update targets, is determined by the process P16.

When information indicating that the S/W update is terminated normally is transmitted from all the hot water supply devices 100A, 100B . . . , the communication adapter 40 advances the processing to the process P18 and changes the storage content of the storage area of the update program in the ROM 45a from the overwrite prohibited state to the overwritable state. Thus, the update program enters a substantially discarded state. In other words, during the processes P10 to P18, the storage content of the storage area of the update program of the hot water supply device 100 in the ROM 45a is set to the rewrite prohibited state, and the update program is protected.

When the update program is in the discarded state, the communication adapter 40 changes the status of whether the S/W update is executable in the subsequent periodic communication C20 to "executable". Thus, in the communication C20c and thereafter, the server 20 is notified that the S/W update in the hot water supply system 10 connected to the communication adapter 40 is executable. Therefore, in the communication C30c in response to the communication C20c, like the communication C30a, it is possible to add the S/W update information for transmission.

Then, when there is a new program to be updated, the server 20 can add the S/W update information by the communication C30, like the communication C30a described above, to start the S/W update processing to the program of the latest version in the hot water supply system 10 connected to the communication adapter 40.

As described above, in the S/W update using the communication connection through the relay device according to the first embodiment, the S/W update processing can be executed for a plurality of hot water supply devices 100 by only transmitting the update program from the server 20 to the communication adapter 40 once, and therefore it is possible to suppress the communication traffic between the server 20 and the communication adapter 40 and further suppress the communication time.

FIG. 4 illustrates the flow of transmission of the update program from the communication adapter 40 to each hot water supply device 100 and the flow when the S/W update in each hot water supply device 100 is terminated normally, that is, so-called normal S/W update. The following describes the operation of the communication adapter 40 in the case where an abnormality occurs during the S/W update processing.

Figure 5:
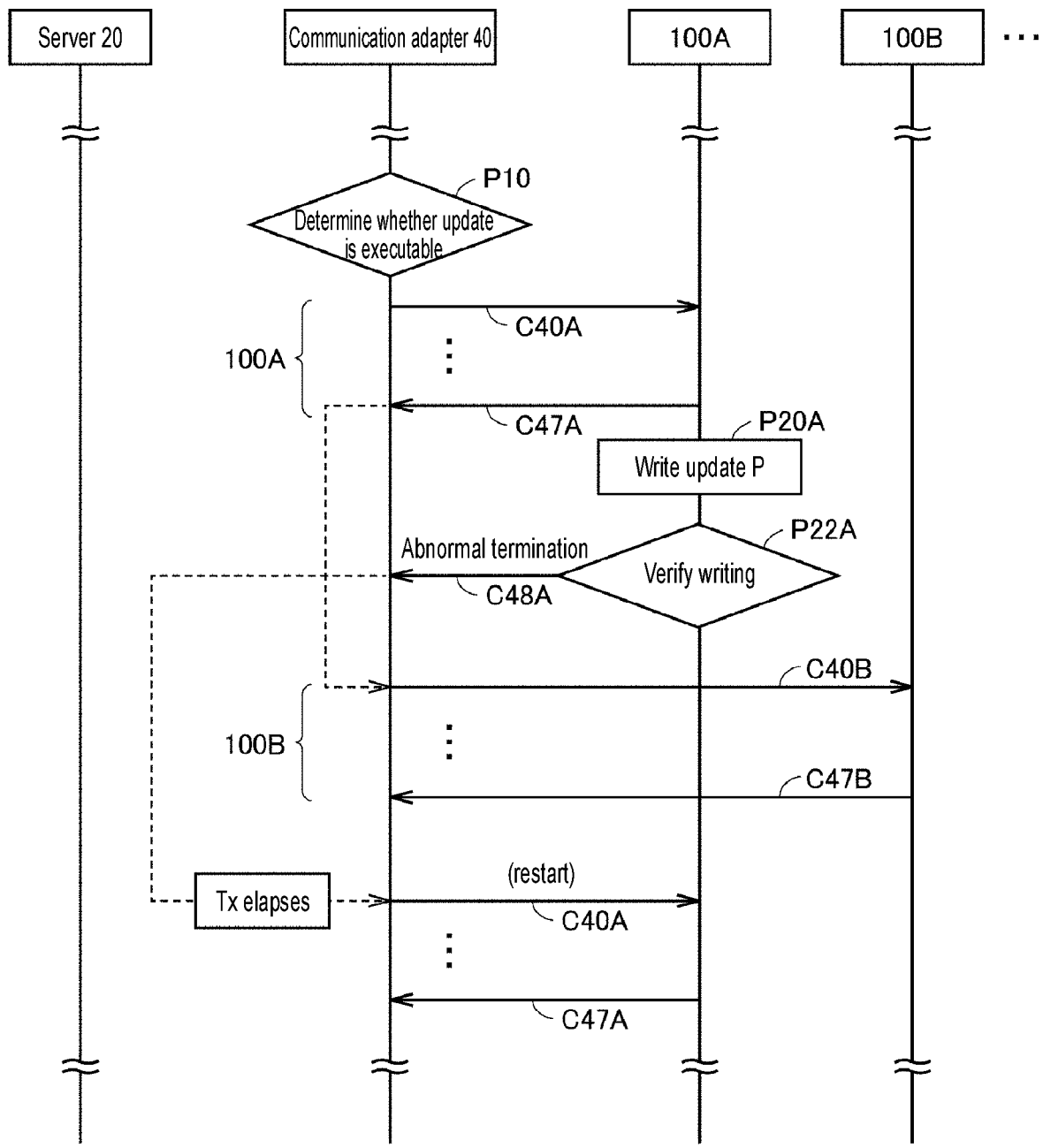
FIG. 5 is a sequence diagram showing a flow of processing when the S/W update in the hot water utilization facility is terminated abnormally.

FIG. 5 shows a flow of processing when the S/W update in the hot water supply device 100A is terminated abnormally.

Referring to FIG. 5, the update program and the verification data are transmitted from the communication adapter 40 to the hot water supply device 100A by the same communications C40A to C47A as FIG. 4. However, in the hot water supply device 100A, the S/W update using the new program is terminated abnormally, and the communication adapter 40 is notified of the abnormal termination by the communication C48A.

At this time, the communication adapter 40 starts the update processing of the update program for the next hot water supply device 100B without waiting for the S/W update result in the hot water supply device 100A, to which the update program has been transmitted.

When detecting that the S/W update in the hot water supply device 100A is terminated abnormally by the communication C48A, the communication adapter 40 restarts a series of communications C40A to C47A for the hot water supply device 100A after a predetermined time Tx elapses. At this timing, if the hot water supply device 100A is in the S/W update "executable" state, it is possible to retry the S/W update by rewriting the update program. For example, the predetermined time Tx may be set to about 24 hours to 12 hours. The predetermined time Tx corresponds to the "second time".

Thus, even if the S/W update in the hot water supply device (S/W update target device), to which the update program has been transmitted, is terminated abnormally, it is possible to automatically restart the S/W update accompanying retransmission of the update program to the hot water supply device.

Until the hot water supply device 100A replies with normal termination, execution of the process P18 is rejected by the determination of the process P16 shown in FIG. 4. Therefore, in the communication adapter 40, the update program is continuously held in the ROM 45a until notification of normal termination of the S/W update is transmitted from the hot water supply device 100A, in which the S/W update was once terminated abnormally, by the communication C48A. Thus, it is possible to prevent the communication adapter 40 from downloading the update program from the server 20 again.

Figure 6:
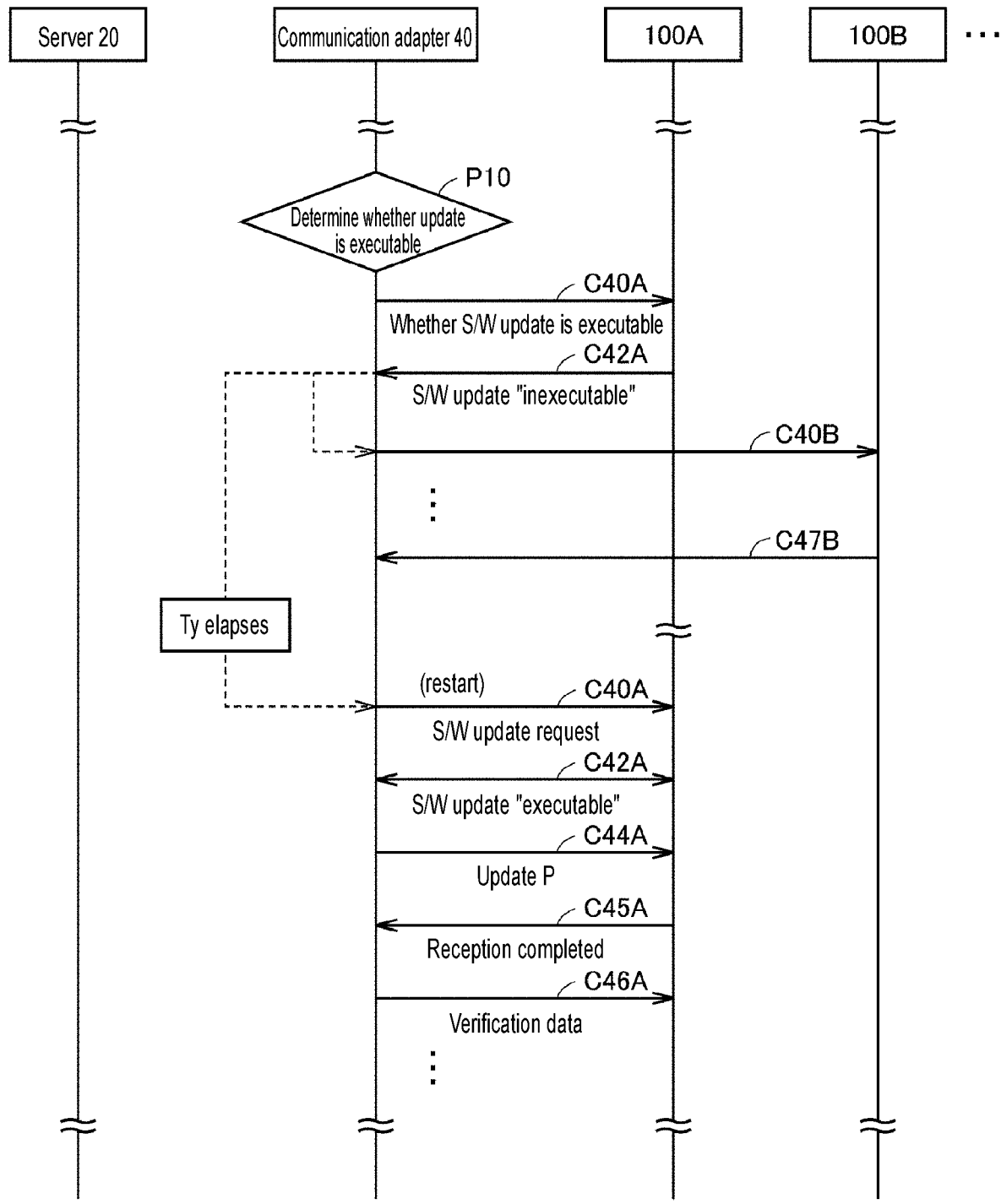
FIG. 6 is a sequence diagram showing a flow of processing when the S/W update in the hot water utilization facility is in an inexecutable state.

FIG. 6 shows the processing when the hot water supply device 100A is in the S/W update inexecutable state.

Referring to FIG. 6, if the timing is "in operation", the hot water supply device 100A replies that the S/W update is "inexecutable" by the communication C42A in response to the inquiry about whether the S/W update is executable transmitted by the same communication C40A as FIG. 4. Thus, the communication adapter 40 switches the transmission target of the update program to the next hot water supply device 100B without starting the processing of the communication C44A and thereafter (FIG. 4) for the hot water supply device 100A. As a result, the communication C40B for the hot water supply device 100B is started, and the update program and the verification data are transmitted to the hot water supply device 100B by the same communications C40B to C47B as FIG. 4. Further, in the hot water supply device 100B, the S/W update processing using the received update program and verification data is executed by the processes P20B to P25B in FIG. 4.

When receiving that the S/W update is "inexecutable" from the hot water supply device 100A by the communication C42A, the communication adapter 40 restarts the communication C40A to retry the transmission of the update program to the hot water supply device 100A after a fixed time Ty elapses. Then, at this timing, if the hot water supply device 100A is in the S/W update "executable" state (communication C42A), the communications C44A to C46A are started. Thus, it is possible to retry the S/W update by rewriting the update program in the hot water supply device 100A. The predetermined time Ty can be set to any time, but considering the number of S/W update target devices determined in the process P10, for example, it can be set by adding a margin to the estimated time required for completing transmission process of the update program to all the S/W update target devices (hot water supply devices). Alternatively, the predetermined time Ty may be a uniform fixed time. The predetermined time Ty corresponds to the "first time".

Thus, in the hot water supply device selected as the transmission target of the update program (S/W update target device), even if the update processing is inexecutable as the hot water supply device is in operation, it is possible to automatically restart the S/W update by retransmitting the update program to the hot water supply device.

In addition, while the update program is not transmitted to the hot water supply device 100A, normal termination of the S/W update performed by writing the update program will not be transmitted by the communication C48A from the hot water supply device 100A. Therefore, in the communication adapter 40, the state where the update program is protected in the program storage area in the ROM 45a is continued.

FIG. 1 to FIG. 6 illustrate a case where the hot water supply devices 100 are the S/W update target devices. However, the devices that serve as the S/W update targets may be devices other than the hot water supply devices 100 as long as they are constituent devices of the hot water supply system 10 connected to the communication adapter 40.

Figure 7:
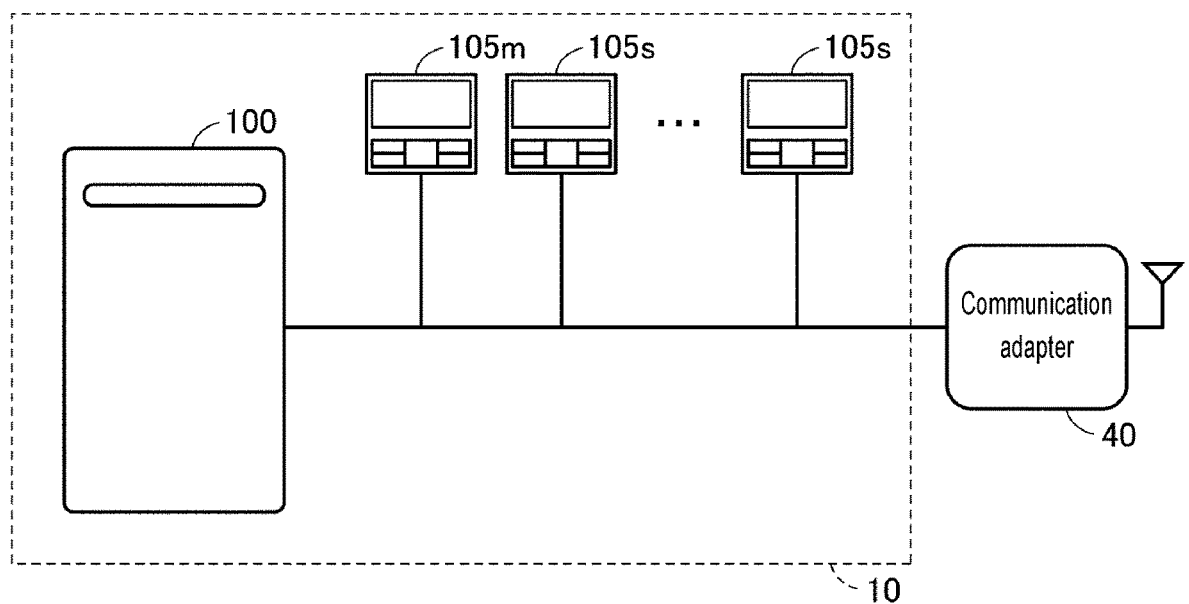
FIG. 7 is a block diagram illustrating another example of a plurality of devices for software update.
Figure 8:
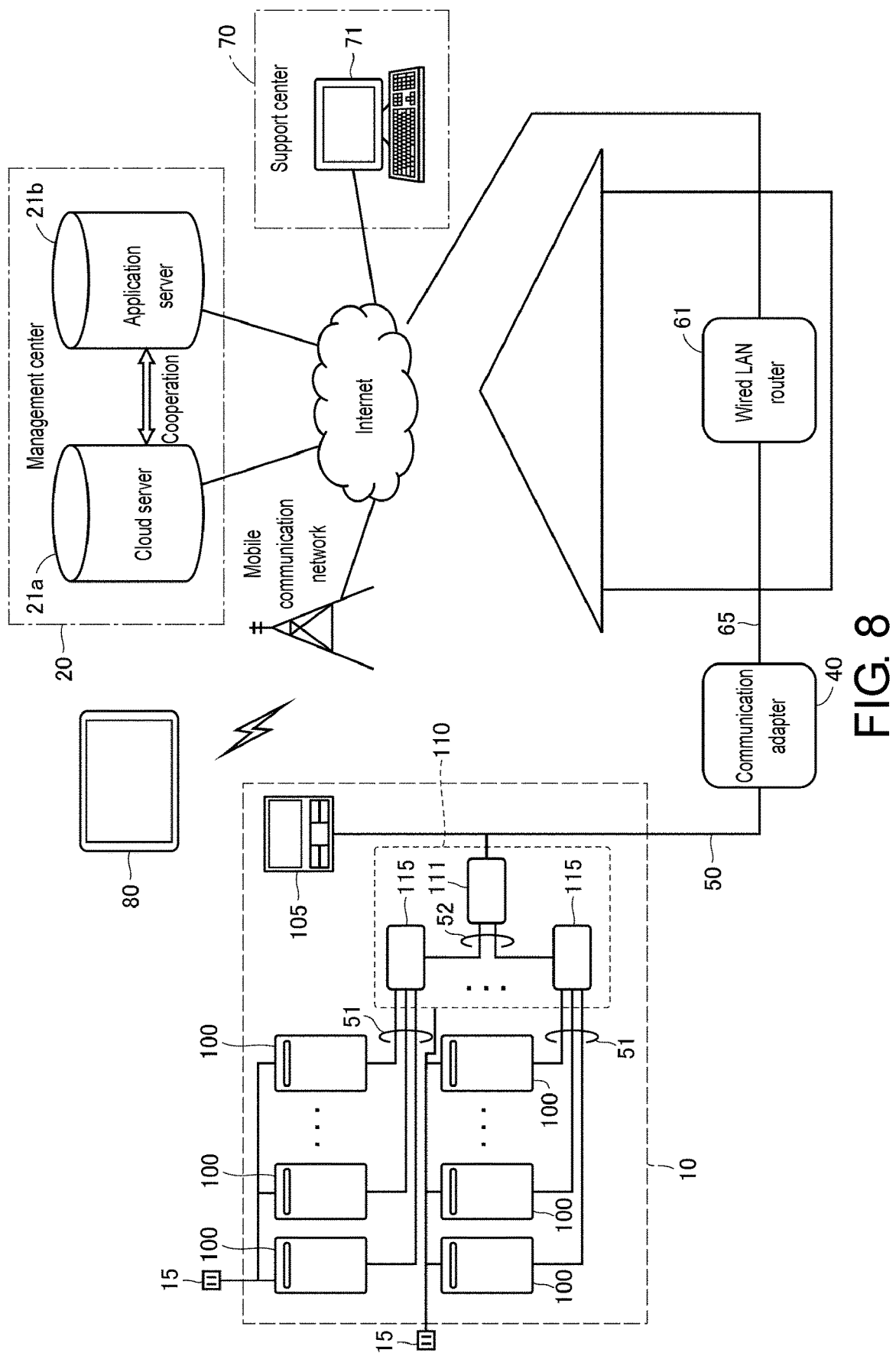
FIG. 8 is a block diagram illustrating a modified example of the communication connection form between the communication adapter and the management center (server) according to the present embodiment.

For example, as shown in FIG. 7, the hot water supply system 10 may be configured to include a main remote controller 105m and a plurality of sub remote controllers 105s connected to one hot water supply device 100 by communication lines. Software differs between the main remote controller 105m and the sub remote controller 105s, whereas the sub remote controllers 105s have common software.

Therefore, when upgrading the software of the sub remote controller 105s, it is required to perform S/W update for a plurality of sub remote controllers 105s in the hot water supply system 10. In this case, the S/W update processing of the update program can be executed by the same processes as described with reference to FIG. 4 to FIG. 6 with the sub remote controllers 105s as the devices serving as the S/W update targets.

Alternatively, as described with reference to FIG. 1, in the hot water supply system 10 to which a plurality of system controllers 115 are connected, when upgrading the software of the system controller 115, it is also possible to apply the S/W update processing described with reference to FIG. 4 to FIG. 6 with the system controllers 115 as the devices serving as the S/W update targets.

Furthermore, FIG. 1 illustrates the configuration example in which the communication adapter 40 is connected to the Internet via the wireless LAN router 60. However, in the remote management system to which the communication adapter 40 according to the present embodiment is applied, the communication connection between the communication adapter 40 and the server 20 may be realized in any form.

For example, as shown in FIG. 7, the communication connection via the Internet between the communication adapter 40 and the server 20 can still be established when a wired LAN router 61 is used in place of the wireless LAN router 60. In this case, the communication adapter 40 can be configured to communicate with the wired LAN router 61 by a predetermined communication protocol (for example, IEEE 802.3 of the Ethernet standard, etc.).

Alternatively, the communication adapter 40 may be configured to directly transmit/receive communication data to/from the server 20 via the communication network by using a mobile communication network (for example, a 3G line or a 4G line) instead of the wireless LAN router 60 or the wired LAN router 61. As described above, the communication connection between the communication adapter 40 and the server 20 can be in any form as long as it can achieve bidirectional communication, including transmission/reception of the update program, between them.

The embodiment disclosed here should be considered exemplary in all respects and not restrictive. The scope of the disclosure is defined by the scope of the claims rather than the description above and is intended to include all modifications within the meaning and scope equivalent to the scope of the claims.

What is claimed is:

1. A relay device communicably connected between a hot water supply system and a management device of the hot water supply system, the relay device comprising:
   a first communication part configured to transmit/receive information to/from the hot water supply system via a communication line;
   a second communication part configured to transmit/receive information to/from the management device via a communication network;
   a storage part comprising a program storage area; and
   a control part controlling operations of the first communication part and the second communication part and writing and reading to/from the program storage area,
   wherein the first communication part receives, from each of a plurality of devices which are components of the hot water supply system, identification information and version information of software of the devices,
   the second communication part receives an update program for software update of the devices from the management device,
   the control part writes the update program received by the second communication part to the program storage area and extracts one or more software update target devices from the devices based on the identification information and the version information of the devices, and
   when there are more than one software update target device, the control part sequentially selects one of the software update target devices and transmits the update program stored in the program storage area to the selected one device by the first communication part.

2. The relay device according to claim 1, wherein the control part transmits an inquiry about whether the software update is executable to the selected one device of the software update target devices by the first communication part, and transmits the update program when the one device replies that the software update is executable.

3. The relay device according to claim 2, wherein the control part switches to select another device of the software update target devices when the selected one device of the software update target devices replies that the software update is inexecutable in response to the inquiry.

4. The relay device according to claim 3, wherein when the selected one device of the software update target devices replies that the software update is inexecutable in response to the inquiry, the control part selects the one device again and transmits the inquiry after a predetermined first time elapses.

5. The relay device according to claim 4, wherein when receiving a notification of normal termination of the software update from all the software update target devices, the control part changes a storage content corresponding to the update program in the program storage area from a rewrite prohibited state to a writable state.

6. A hot water supply device, comprising a controller communicably connected to the relay device according to claim 4 via the communication line,
   wherein the hot water supply device is the component of the hot water supply system,
   the controller executes data communication with the management device via the relay device, and
   the software update of the controller is executed using the update program transmitted from the relay device.

7. The relay device according to claim 3, wherein when receiving a notification of normal termination of the software update from all the software update target devices, the control part changes a storage content corresponding to the update program in the program storage area from a rewrite prohibited state to a writable state.

8. A hot water supply device, comprising a controller communicably connected to the relay device according to claim 3 via the communication line,
   wherein the hot water supply device is the component of the hot water supply system,
   the controller executes data communication with the management device via the relay device, and
   the software update of the controller is executed using the update program transmitted from the relay device.

9. The relay device according to claim 2, wherein when receiving a notification of normal termination of the software update from all the software update target devices, the control part changes a storage content corresponding to the update program in the program storage area from a rewrite prohibited state to a writable state.

10. A hot water supply device, comprising a controller communicably connected to the relay device according to claim 2 via the communication line,
    wherein the hot water supply device is the component of the hot water supply system,
    the controller executes data communication with the management device via the relay device, and
    the software update of the controller is executed using the update program transmitted from the relay device.

11. The relay device according to claim 1, wherein when receiving a notification of abnormal termination of the software update from the one device, to which the update program has been transmitted, of the software update target devices, the control part transmits again the inquiry about whether the software update is executable to the one device by the first communication part after a predetermined second time elapses, and transmits again the update program when the one device replies that the software update is executable in response to the inquiry.

12. The relay device according to claim 5, wherein when receiving a notification of normal termination of the software update from all the software update target devices, the control part changes a storage content corresponding to the update program in the program storage area from a rewrite prohibited state to a writable state.

13. A hot water supply device, comprising a controller communicably connected to the relay device according to claim 11 via the communication line,
    wherein the hot water supply device is the component of the hot water supply system,
    the controller executes data communication with the management device via the relay device, and
    the software update of the controller is executed using the update program transmitted from the relay device.

14. The relay device according to claim 1, wherein when receiving a notification of normal termination of the software update from all the software update target devices, the control part changes a storage content corresponding to the update program in the program storage area from a rewrite prohibited state to a writable state.

15. A hot water supply device, comprising a controller communicably connected to the relay device according to claim 14 via the communication line,
    wherein the hot water supply device is the component of the hot water supply system,
    the controller executes data communication with the management device via the relay device, and
    the software update of the controller is executed using the update program transmitted from the relay device.

16. A hot water supply device, comprising a controller communicably connected to the relay device according to claim 1 via the communication line,
    wherein the hot water supply device is the component of the hot water supply system,
    the controller executes data communication with the management device via the relay device, and
    the software update of the controller is executed using the update program transmitted from the relay device.

* * * * *